United States Patent
Lee et al.

(10) Patent No.: US 11,463,218 B2
(45) Date of Patent: *Oct. 4, 2022

(54) METHOD FOR TRANSMITTING FRAME AND COMMUNICATION DEVICE FOR PERFORMING THE SAME

(71) Applicant: ELECTRONICS AND TELECOMMUNICATIONS RESEARCH INSTITUTE, Daejeon (KR)

(72) Inventors: Yu Ro Lee, Daejeon (KR); Jae Woo Park, Daejeon (KR); Jae Seung Lee, Daejeon (KR); Jee Yon Choi, Daejeon (KR); Il Gyu Kim, Chungcheongbuk-do (KR); Seung Chan Bang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 129 days.

This patent is subject to a terminal disclaimer.

(21) Appl. No.: 16/921,541

(22) Filed: Jul. 6, 2020

(65) Prior Publication Data
US 2020/0336261 A1    Oct. 22, 2020

Related U.S. Application Data

(63) Continuation of application No. 16/042,838, filed on Jul. 23, 2018, now Pat. No. 10,708,026, which is a
(Continued)

(30) Foreign Application Priority Data

Jun. 15, 2015    (KR) .................... 10-2015-0084007

(51) Int. Cl.
*H04L 5/00* (2006.01)
*H04B 17/336* (2015.01)
(Continued)

(52) U.S. Cl.
CPC ............. *H04L 5/005* (2013.01); *H04B 7/024* (2013.01); *H04B 7/0452* (2013.01);
(Continued)

(58) Field of Classification Search
CPC ..... H04L 5/005; H04L 5/0023; H04L 5/0032; H04L 5/0073; H04L 27/2613;
(Continued)

(56) References Cited

U.S. PATENT DOCUMENTS 10,033,501 B2 *   7/2018   Lee ................... H04B 7/024
10,708,026 B2 *   7/2020   Lee ................... H04B 7/0452
(Continued)

FOREIGN PATENT DOCUMENTS

KR    20140109911 A    9/2014
KR    20140133480 A    11/2014
(Continued)

OTHER PUBLICATIONS

Minyoung Park et al., "IEEE 802.11 Wireless LANs Specification Framework for TGah", IEEE, Mar. 20, 2013.

*Primary Examiner* — Benjamin H Elliott, IV

(57) ABSTRACT

Disclosed are a frame transmission method and a communication device performing the same. The communication device transmits a null data packet (NDP)-announcement (NDP-A) including information on a plurality of communication devices participating in interference alignment and transmits an NDP including a common signal field and a common training field commonly applied to the plurality of communication devices.

12 Claims, 14 Drawing Sheets

Related U.S. Application Data continuation of application No. 15/061,193, filed on Mar. 4, 2016, now Pat. No. 10,033,501.

(51) Int. Cl.
*H04B 7/024* (2017.01)
*H04L 27/26* (2006.01)
*H04B 7/0452* (2017.01)
*H04B 7/06* (2006.01)

(52) U.S. Cl.
CPC ......... *H04B 7/0617* (2013.01); *H04B 17/336* (2015.01); *H04L 5/0023* (2013.01); *H04L 5/0032* (2013.01); *H04L 5/0073* (2013.01); *H04L 27/2613* (2013.01)

(58) Field of Classification Search
CPC .... H04B 7/024; H04B 7/0452; H04B 7/0617; H04B 17/336
See application file for complete search history.

(56) References Cited

U.S. PATENT DOCUMENTS

| | | | | |
|---|---|---|---|---|
| 2010/0260138 A1* | 10/2010 | Liu | ............... | H04L 5/0023 370/330 |
| 2011/0128929 A1* | 6/2011 | Liu | ............... | H04L 25/03343 370/329 |
| 2011/0222472 A1* | 9/2011 | Breit | ............... | H04L 1/0033 370/328 |
| 2011/0255488 A1 | 10/2011 | Lee et al. | | |
| 2012/0026909 A1* | 2/2012 | Seok | ............... | H04B 7/0617 370/252 |
| 2012/0327982 A1 | 12/2012 | Lee et al. | | |
| 2013/0058273 A1* | 3/2013 | Wentink | ............... | H04W 8/26 370/328 |
| 2013/0145224 A1 | 6/2013 | Kim et al. | | |
| 2013/0336306 A1* | 12/2013 | Sohn | ............... | H04B 7/0452 370/338 |
| 2014/0044112 A1* | 2/2014 | Stephens | ............... | H04B 7/0643 370/338 |
| 2014/0056204 A1* | 2/2014 | Suh | ............... | H04L 25/0228 370/312 |
| 2014/0056205 A1* | 2/2014 | Aboul-Magd | ............... | H04W 28/16 370/312 |
| 2014/0105159 A1 | 4/2014 | Kim | | |
| 2015/0139127 A1* | 5/2015 | Oh | ............... | H04L 25/0204 370/329 |
| 2015/0358067 A1* | 12/2015 | Zhang | ............... | H04B 7/15507 370/315 |
| 2016/0088637 A1* | 3/2016 | Suh | ............... | H04L 1/0009 370/329 |
| 2016/0156497 A1* | 6/2016 | Yang | ............... | H04L 25/0218 370/328 |
| 2016/0165607 A1* | 6/2016 | Hedayat | ............... | H04W 52/0245 370/338 |
| 2016/0330732 A1* | 11/2016 | Moon | ............... | H04B 7/0619 |
| 2016/0365954 A1* | 12/2016 | Lee | ............... | H04L 5/0023 |
| 2018/0167882 A1* | 6/2018 | Choi | ............... | H04W 72/121 |
| 2018/0331796 A1* | 11/2018 | Lee | ............... | H04B 17/336 |
| 2020/0336261 A1* | 10/2020 | Lee | ............... | H04L 5/0073 |

FOREIGN PATENT DOCUMENTS

| | | |
|---|---|---|
| KR | 20150051911 A | 5/2015 |
| WO | WO2014206115 A1 | 12/2014 |

* cited by examiner

FIG. 8

| | B0 | B3 | B4 | B7 | B8 | B16 | B17 | B19 |
|---|---|---|---|---|---|---|---|---|
| Name : | AP[1]_STS | | MCS[0] | | Partial AID[0] | | Reserved | |
| Bits : | 4 | | 4 | | 9 | | 3 | |

METHOD FOR TRANSMITTING FRAME AND COMMUNICATION DEVICE FOR PERFORMING THE SAME

CROSS-REFERENCE TO RELATED APPLICATION

This application is a continuation of U.S. patent application Ser. No. 16/042,838 filed Jul. 23, 2018 and now issued as U.S. Pat. No. 10,708,026, which is a continuation of U.S. patent application Ser. No. 15/061,193 filed Mar. 4, 2016 and now issued as U.S. Pat. No. 10,033,501, which claims the priority benefit of Korean Patent Application No. 10-2015-0084007 filed on Jun. 15, 2015 in the Korean Intellectual Property Office, the disclosure of which is incorporated herein by reference. The certified copy of the priority claimed above has been retrieved in U.S. patent application Ser. No. 16/042,838 on Aug. 18, 2018.

BACKGROUND

1. Field of the Invention

Embodiments relate to a method of transmitting a frame and a communication device for performing the same, and more particularly to a method and a device allowing a plurality of communication devices participating in interference alignment to simultaneously transmit training symbols.

2. Description of the Related Art

In general, a local area network (LAN) that is a near field communication network is divided into a wired LAN and a wireless LAN (WLAN). The WLAN employs a method of performing communication on a network using propagation instead of using a cable. The WLAN has been introduced as an alternative for overcoming difficulties found in installation, maintenance and repair, and movement by cabling. An increase in mobile users is further accelerating a need for the WLAN.

A WLAN system includes an access point (AP) and a station (STA). The AP is a device which transmits radio waves such that STAs within a service range access the Internet or use a network. The wireless LAN follows an Institute of Electrical and Electronics Engineers (IEEE) 802.11 standard established by the IEEE.

A basic configuration block of a WLAN system defined in IEEE 802.11 is a basic service set (BSS). A BSS may include an independent BSS in which STAs in the BSS perform direct communications with each other, an infrastructure BSS in which an AP is involved in communications between an STA and an STA inside or outside the BSS, and an extended service set which connects different BSSs to extend a service area.

Generally, an IEEE 802.11 based-WLAN system accesses a medium based on carrier sense multiple access/collision avoidance (CSMA/CA) and allows APs to operate independently.

That is, in the WLAN system, an AP independently selects a communication channel by an operator or a channel allocation algorithm. Thus, in the presence of multiple WLAN systems, communication channels used for respective BSSs are highly likely to overlap. When communication channels overlap, possibility of interference occurring between adjacent BSSs is high, causing deterioration in network performance. Thus, there is a need to efficiently reduce interference in a WLAN system.

SUMMARY

An aspect provides a frame transmission method which allows a plurality of communication devices participating in interference alignment to simultaneously transmit training symbols to effectively reduce overhead of preambles for channel information exchange.

Another aspect also provides a frame transmission method which allows a plurality of communication devices to transmit signal fields and training fields having the same values in the same structures to minimize interference which may occur when the communication devices simultaneously transmit training symbols.

Still another aspect provides a frame transmission method which determines a number of interference alignment-long training fields (IA-LTFs) included in an NDP for channel estimation and a number of IA-LTFs included in a data field including data to be transmitted in the same manner to effectively reduce a channel estimation error.

Yet another aspect provides a frame transmission method which determines a number of IA-LTFs included in an NDP based on a number of streams transmitted by a plurality of communication devices to effectively reduce interference between the streams from the communication devices.

According to an aspect, there is provided a frame transmission method of a communication device, the method including transmitting a null data packet (NDP)-announcement (NDP-A) including information on a plurality of communication devices participating in interference alignment; and transmitting an NDP including a common signal field and a common training field commonly applied to the plurality of communication devices.

The plurality of communication devices may perform interference alignment using the common signal field and the common training field.

The common signal field and the common training field may include the same values in the same structures as common signal fields and common training fields included in NDPs transmitted by the plurality of communication devices.

A number of long training fields (LTFs) included in the common training field may be determined based on a number of NDP streams transmitted by the plurality of communication devices.

A number of LTFs included in the common training field may be determined based on a number of antennas of the plurality of communication devices.

A number of LTFs included in the common training field may be the same as a number of LTFs included in each of common training fields of NDPs transmitted by the plurality of communication devices.

When a number of the plurality of communication devices participating in interference alignment is predetermined, the NDP may include information on a number of antennas of the plurality of communication devices, and a station receiving the NDP may estimate a signal-to-interference-plus-noise ratio (SINR) of a communication channel based on a number of antennas of a communication device transmitting the NDP and feed back the estimated SINR to the communication device transmitting the NDP.

When a number of the plurality of communication devices participating in interference alignment is great, the NDP-A may include information on a combination of a plurality of communication devices capable of participating in interference alignment, the NDP may include information for identifying a communication device transmitting the NDP, and a station receiving the NDP may estimate an SINR of a communication channel based on the information on the combination of the plurality of communication devices capable of participating in interference alignment and the information for identifying the communication device transmitting the NDP and feed back the estimated SINR to the communication device transmitting the NDP.

The method may further include transmitting a data frame including a common signal field and a common training field commonly applied to the plurality of communication devices.

A number of LTFs included in the common training field of the data frame may be determined in the same manner as for determining a number of LTFs included in the common training field of the NDP.

A number of LTFs included in the common training field of the data frame may be determined based on a number of data frame streams transmitted by the plurality of communication devices.

Common signal fields and common training fields included in data frames transmitted by the plurality of communication devices may have the same values.

The method may further include transmitting an NDP-poll including information indicating that transmission of the NDP is completed, wherein the transmitting of the data frame transmits the data frame based on feedback information from a station receiving the NDP.

The transmitting of the NDP-A may transmit the NDP-A in a time period when the plurality of communication devices transmits NDP-As.

The transmitting of the NDP may transmit the NDP in a time period when the plurality of communication devices transmits NDPs.

The transmitting of the NDP-A may transmit the NDP-A after an NDP-start (NDP-ST) including information indicating start of transmission of the NDP-A is received.

According to an aspect, there is provided a communication device including a communicator configured to communicate with a station; and a processor configured to control the communicator, wherein the processor performs transmitting an NDP-A including information on a plurality of communication devices participating in interference alignment; and transmitting an NDP including a common signal field and a common training field commonly applied to the plurality of communication devices.

According to an embodiment, a plurality of communication devices participating in interference alignment simultaneously transmits training symbols to effectively reduce overhead of preambles for channel information exchange.

According to an embodiment, a plurality of communication devices transmits signal fields and training fields having the same values in the same structures to minimize interference which may occur when the communication devices simultaneously transmit training symbols.

According to an embodiment, an IA-LTF) included in an NDP for channel estimation and an IA-LTF included in a data field including data to be transmitted are determined in the same manner to effectively reduce a channel estimation error.

According to an embodiment, a number of IA-LTFs included in an NDP is determined based on a number of streams transmitted by a plurality of communication devices to effectively reduce interference between the streams from the communication devices.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 8 illustrates an example structure of an IA-SIG-B included in a data frame according to an embodiment;

DETAILED DESCRIPTION

Figure 1:
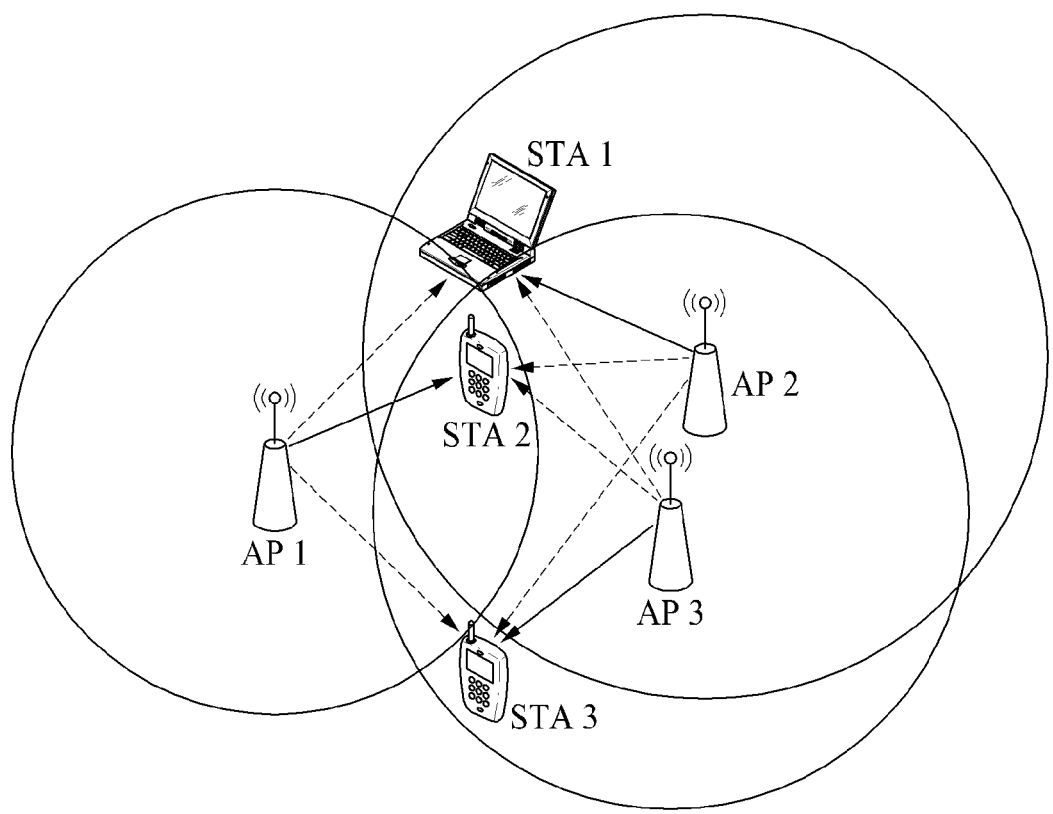
FIG. 1 illustrates a basic service set (BSS) architecture in an overlapping basic service set (OBSS) environment according to an embodiment.

Hereinafter, example embodiments of the present disclosure will be described in detail with reference to the accompanying drawings. It is to be understood that the detailed description, which will be disclosed along with the accompanying drawings, is intended to describe the example embodiments of the present disclosure, and is not intended to describe a unique embodiment with which the present disclosure can be carried out. The following detailed description includes detailed matters to provide full understanding of the present disclosure. However, it will be apparent to those skilled in the art that the present disclosure can be carried out without the detailed matters.

The following embodiments are achieved by combination of structural elements and features of the present disclosure in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

Particular terms used in the following description are provided for understanding of the present disclosure and may be changed with other terms without departing from the technical scope of the present disclosure.

In some cases, to prevent the concept of the present disclosure from being ambiguous, descriptions of known structures and apparatuses will be omitted, or will be made in the form of a block diagram based on main functions of each structure and apparatus. Also, like reference numerals denote like elements through the whole document.

Embodiments of the present disclosure may be supported by standards disclosed in at least one of wireless access systems, such as an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. That is, steps and parts not mentioned in the embodiments in order to clarify the technical concept of the present disclosure may be supported by the foregoing standards. Further, all terms disclosed in this document may be described by the standards.

Technologies described below may be used in various wireless access systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be implemented with a radio technology, such as Universal Terrestrial Radio Access (UTRA) or CDMA2000. TDMA may be implemented with a radio technology, such as Global System for Mobile communications (GSM)/General Packet Radio Service (GPRS)/Enhanced Data Rates for GSM Evolution (EDGE). OFDMA may be implemented with a radio technology, such as IEEE 802.11 (Wi-Fi), IEEE 802.16 (WiMAX), IEEE 802-20, evolved-UTRA (E-UTRA), and the like. Although the following description focuses on an IEEE 802.11 system for clarity, the technical concept of the present disclosure are not limited thereto.

FIG. 1 illustrates a basic service set (BSS) architecture in an overlapping basic service set (OBSS) environment according to an embodiment.

A wireless local area network (WLAN) system may include at least one BSS. The BSS may include an access point (AP) and at least one station (STA).

An AP is a functional entity which provides an STA associated with the AP with connection to a distributed system via a wireless medium. The AP may communicate with at least one STA on a downlink at a randomly determined moment.

A downlink is a communication link from an AP to STAs, and an uplink is a communication link from STAs to an AP. An STA may perform peer-to-peer communication with another STA.

In a BSS including an AP, although communication between STAs is basically performed via the AP, STAs may directly communicate with each other not via the AP when direct links are established between the STAs. For example, the AP may also be referred to as other terms, such as a central controller, a base station (BS), node-B, or a base transceiver system (BTS), and be realized as the same.

A station (STA) may also be referred to as other terms, such as a mobile terminal, a wireless device, a wireless transmit/receive unit (WTRU), user equipment (UE), a mobile station (MS), a mobile subscriber unit or simply a user, and be realized as the same.

An AP may simultaneously transmit data to an STA group including at least one STA among a plurality of STAs associated with the AP. Here, "simultaneously" means "at the same time" or "at different times at a preset interval."

The WLAN system supports multi-user multiple-input multiple-output (MU-MIMO). In an MU-MIMO communication system, an AP may transmit a plurality of spatial streams to a plurality of STAs using multiple antennas. Further, when the AP uses a plurality of transmitting antennas, the AP may transmit data frames to STAs using beamforming in order to improve transmission performance. The AP may be referred to as a communication device. In this specification, the terms "AP" and "communication device" may be used together for convenience of description.

In a wireless transmission environment of the WLAN system illustrated in FIG. 1, there are three communication devices and one STA is present per communication device. As the communication devices are located within coverage of another communication device, BSSs may overlap with each other. Here, adjacent communication devices use different frequency channels to prevent interference between adjacent BSSs. However, a gradually increasing number of adjacent APs and STAs but limited available frequency channels may cause an OBSS environment.

That is, an OBSS environment may refer to an environment in which adjacent communication devices are caused to use the same frequency channel by a great number of communication devices and STAs being concentrated but limited frequency channels available for wireless communication.

An STA belonging to an OBSS environment may receive an undesired signal from an adjacent communication device. For example, STA2 may want to receive a signal from AP1. However, STA2 is located within coverages of other adjacent communication devices, AP2 and AP3, and thus may receive not only a signal from AP1 but also signals from AP2 and AP3. STA2 may receive an interference signal from AP2 and AP3, the interference signal being represented by a dashed line in FIG. 1.

Figure 2:
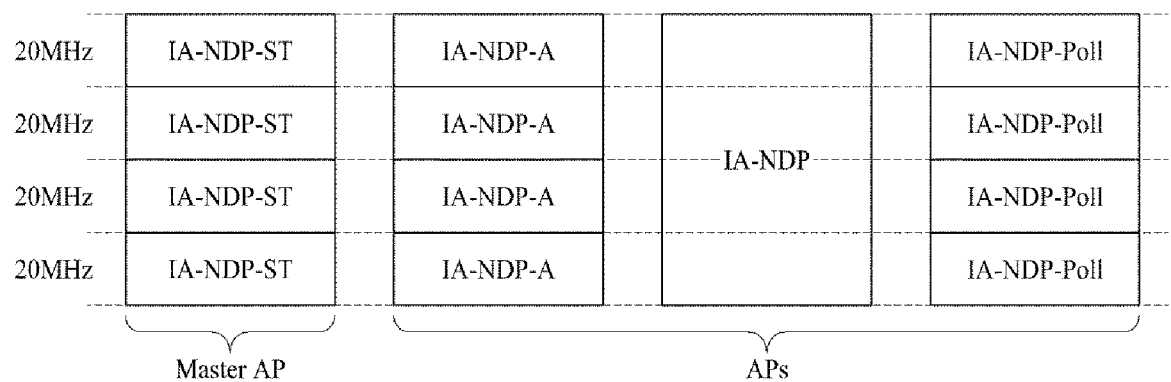
FIG. 2 illustrates frames transmitted by communication devices participating in interference alignment (IA) according to an embodiment.

FIG. 2 illustrates frames transmitted by communication devices participating in interference alignment according to an embodiment.

Any one of a plurality of communication devices participating in interference alignment (IA) may be selected as a master communication device (master AP) which is empowered to control operations of other communication devices. For example, the master communication device may be a communication device capable of the most effectively monitoring states of other communication devices among the plurality of communication devices. An embodiment of selecting a master communication device is not limited thereto, and various methods may be used to select a master communication device.

The master communication device may transmit interference an alignment-null data packet-start (IA-NDP-ST) to mark start of frame transmission. The communication devices may transmit an interference alignment-null data packet-announcement (IA-NDP-A) after receiving the IA-NDP-ST. The IA-NDP-A may include information on the communication devices participating in IA (for example, a communication device list). Further, the IA-NDP-A may include information on at least one STA required to perform channel feedback (for example, an STA list). The IA-NDP-As transmitted from the communication devices may include the same value in the same physical layer convergence procedure protocol data unit (PPDU) structure. The communication devices may transmit IA-NDP-As in a non-high-throughput (HT) format in the same time period.

The communication devices may transmit an interference alignment-null data packet (IA-NDP) after transmitting the IA-NDP-A. The IA-NDP is a frame having no data field, which may include a signal field and a training field. The IA-NDP may be transmitted via beamforming with a transmission vector predetermined by communication device or be transmitted without beamforming.

For convenience of description, a communication device performing communication with a particular STA among the communication devices participating in IA is referred to as a reference communication device. An STA may receive an IA-NDP from the reference communication device based on an IA-NDP-A received from the reference communication device. The STA may transmit feedback information to the reference communication device based on the IA-NDP from the reference communication device. The communication devices may transmit IA-NDPs in the same time period.

The communication devices may transmit an interference alignment-null data packet-poll (IA-NDP-Poll) after transmitting the IA-NDPs. The communication devices may transmit the IA-NDP-Poll, thereby explicitly notifying the STA that a frame exchange sequence (for example, IA-NDP-ST, IA-NDP-A, IA-NDP, and the like) terminates. The communication devices may transmit IA-NDP-Polls in the same time period.

As illustrated in FIG. 2, the IA-NDP-ST, IA-NDP-A, and IA-NDP-Poll may be transmitted repeatedly in each 20-MHz frequency band, and the IA-NDP may be transmitted in an 80-MHz frequency band.

For convenience of description, hereinafter, an IA-NDP-ST may be referred to as an NDP-ST, an IA-NDP-A as an NDP-A, an IA-NDP as an NDP, and an IA-NDP-Poll as an NDP-Poll.

Figure 3:
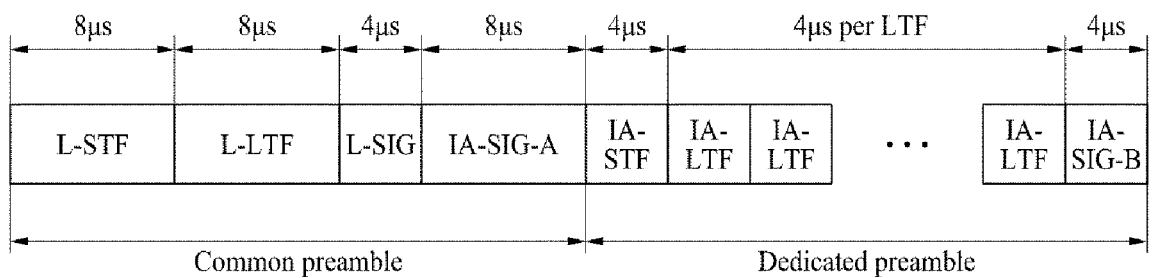
FIG. 3 illustrates an example of a null data packet (NDP) in a physical layer convergence procedure protocol data unit (PPDU) structure transmitted from a plurality of communication devices participating in IA according to an embodiment.

FIG. 3 illustrates an example of an NDP in a PPDU structure transmitted from a plurality of communication devices participating in IA according to an embodiment.

The NDP in the PPDU structure is divided broadly into a common preamble and a dedicated preamble. The common preamble is a portion commonly applied to the communication devices participating in IA. That is, common preambles of NDPs transmitted from the communication devices may include the same value in the same structure.

The common preamble includes a Legacy-Short Training Field (L-STF), a Legacy-Long Training Field (L-LTF), a Legacy-Signal Field (L-SIG), and an IA-Signal Field-A (IA-SIG-A). The L-STF, L-LTF, and L-SIG may include information for a legacy STA capable of receiving a non-HT format. The L-SIG may include an L-Length representing information on a length from the L-SIG to the IA-SIG-B.

The IA-SIG-A may include information on the communication devices participating in IA. The information on the communication devices may include information on which IA-LTF an STA receiving the NDP needs to refer to among a plurality of IA-LTFs included in the dedicated preamble. In the embodiment, the STA may need to refer to a plurality of IA-LTFs. Also, the IA-SIG-A may include a list of the communication devices participating in IA and information on a number of antennas included in each communication device.

The dedicated preamble is a portion transmitted via beamforming with a transmission vector or matrix predetermined by communication device or transmitted without beamforming. The dedicated preamble may include an IA-Short Training Field (IA-STF), an IA-Long Training Field (IA-LTF), and an IA-Signal Field-B (IA-SIG-B). The IA-STF may include information for automatic gain control (AGC) of an STA and signal detection, and the IA-LTF may include information for channel estimation for an STA and frequency error estimation. A number of IA-LTFs may be determined based on a number of antennas included in the communication devices participating in IA. A method of determining a number of IA-LTFs will be described in detail with reference to FIG. 4.

The IA-SIG-B may include information for identifying a communication device transmitting the NDP. For example, the IA-SIG-B may include a pattern or sequence for identifying a communication device transmitting the NDP.

In FIG. 3, lengths of the NDP fields are expressed in microseconds (S), which does not limit or restrict an embodiment applicable to lengths of the fields included in the NDP or the structure of the NDP.

Figure 4:
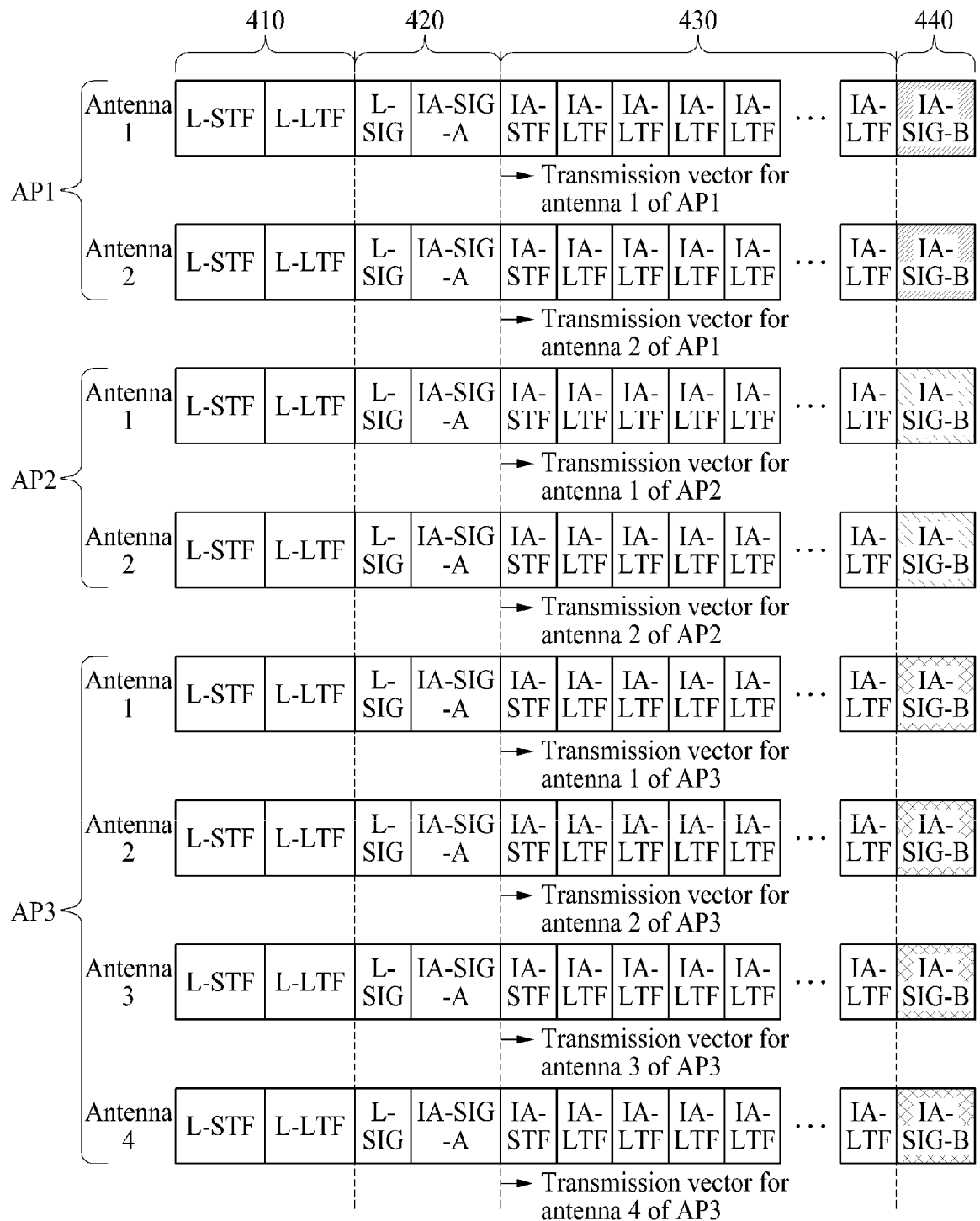
FIG. 4 illustrates a method of determining a number of IA-Long Training Fields (LTFs) included in an NDP according to an embodiment.

FIG. 4 illustrates a method of determining a number of IA-LTFs included in an NDP according to an embodiment.

FIG. 4 illustrates NDPs in a wireless transmission environment of three communication devices. Here, a first communication device (AP1) may include two antennas, a second communication device (AP2) may include two antennas, and a third communication device (AP3) may include four antennas. Each of the communication devices may transmit the same number of NDP streams as a number of antennas included in each communication device.

Each of the NDPs may include a legacy training field 410, a common signal field 420, a common training field 430, and a dedicated signal field 440. The legacy training field 410 and the common signal field 420 are constituent fields of a common preamble and may commonly be applied to the communication devices. The legacy training field 410 and the common signal field 420 included in the NDPs transmitted from the communication devices may have the same value in the same structure.

The common training field 430 and the dedicated signal field 440 are constituent fields of a dedicated preamble and may be transmitted via beamforming with a transmission vector or matrix predetermined by a communication device transmitting a corresponding NDP or be transmitted without beamforming. The common training field 430 may include an IA-STF and a plurality of IA-LTFs. The NDPs transmitted from the communication devices may include the common training field 430 including the same value in the same structure.

The dedicated signal field 440 may include information for identifying a communication device transmitting a corresponding NDP among the communication devices. For example, NDPs transmitted from antenna 1 and antenna 2 of the first communication device (AP1) may include an IA-SIG-B in the same pattern or sequence. However, the IA-SIG-Bs included in the NDPs transmitted from the first communication device (AP1) may have a different pattern or sequence from IA-SIG-Bs of NDPs transmitted from the second communication device (AP2) or the third communication device (AP3).

For example, when a sequence included in an IA-SIG-B has a length of 26, the IA-SIG-B of the first communication device (AP1) may have a sequence of 1011_1011_0011_1010_1101_1001_11, an IA-SIG-B of the second communication device (AP2) may have a sequence of the 1101_1001_1011_1011_0011_1010_10, and an IA- SIG-B of the third communication device (AP3) may have a sequence of 0011_1010_1101_1001_1011_1011_01.

A number of IA-LTFs included in the common training field 430 of the NDP may be determined based on a number of antennas of the communication devices participating in IA. Here, the antennas of the communication devices may refer to transmitting antennas used to transmit a frame to an STA.

A mapping code (or mapping matrix) $P_{IALTF}$ mapped to an IA-LTF sequence may be determined based on a number of transmitting antennas of a communication device as follows.

$$P_{IALTF} = \begin{bmatrix} c_{0,0} & c_{0,1} & \cdots & c_{0,m} \\ c_{1,0} & c_{1,1} & \cdots & c_{1,m} \\ \vdots & \vdots & \ddots & \vdots \\ c_{n,0} & c_{n,1} & \cdots & c_{n,m} \end{bmatrix} \xrightarrow{\text{Symbols}} \left.\begin{matrix} \\ \\ \\ \\ \end{matrix}\right\} \begin{matrix} \text{Total number of} \\ \text{Spatial Streams} \\ \text{(or antennas) for} \\ APs \end{matrix} \quad [\text{Equation 1}]$$

In Equation 1, n represents a number of streams of an NDP transmitted by a plurality of communication devices involved in IA, which may be the same as a number of antennas of the communication devices. m represents a number of symbols, which may be determined based on the number of streams of the NDP transmitted by the communication devices. A detailed description of determining m will be described below with reference to Equations 3 to 5.

$$AP1: P_{IALTF,1} = \begin{bmatrix} c_{0,0} & c_{0,1} & \cdots & c_{0,m} \\ c_{1,0} & c_{1,1} & \cdots & c_{0,m} \end{bmatrix} \xrightarrow{\text{Symbols}} \left.\begin{matrix} \\ \\ \end{matrix}\right\} \begin{matrix} \text{Number of} \\ \text{spatial streams} \\ \text{(or antennas)} \\ \text{for } AP1 \end{matrix} \quad [\text{Equation 2}]$$

$$AP2: P_{IALTF,2} = \begin{bmatrix} c_{2,0} & c_{2,1} & \cdots & c_{2,m} \end{bmatrix} \left.\begin{matrix} \\ \end{matrix}\right\} \begin{matrix} \text{Number of} \\ \text{spatial streams} \\ \text{(or antennas)} \\ \text{for } AP2 \end{matrix}$$

$$AP3: P_{IALTF,3} = \begin{bmatrix} c_{3,0} & c_{3,1} & \cdots & c_{3,m} \\ c_{4,0} & c_{4,1} & \cdots & c_{4,m} \end{bmatrix} \left.\begin{matrix} \\ \\ \end{matrix}\right\} \begin{matrix} \text{Number of} \\ \text{spatial streams} \\ \text{(or antennas)} \\ \text{for } AP3 \end{matrix}$$

Equation 2 illustrates mapping matrices $P_{IALTF,1}$, $P_{IALTF,2}$, and $P_{IALTF,3}$ when the first communication device (AP1) transmits two NDP streams, the second communication device (AP2) transmits one NDP stream, and the third communication device (AP3) transmits two NDP streams. The number of symbols, m, may be greater than a number of streams to be transmitted according to a configuration of a mapping code in Equation 3 to Equation 5.

Since the first communication device (AP1) includes two antennas and transmits two NDP streams, a first mapping matrix $P_{IALTF,1}$ may be allocated first two rows. Since the second communication device (AP2) includes one antenna and transmits one NDP stream, a second mapping matrix $P_{IALTF,2}$ may be allocated one subsequent row. Since the third communication device (AP3) includes two antennas and transmits two NDP streams, a third mapping matrix $P_{IALTF,3}$ may be allocated two subsequent rows.

Since a symbol in a mapping code is mapped to an IA-LTF included in an NDP, a number of symbols in the mapping code may be the same as a number of IA-LTFs included in the NDP. The number of IA-LTFs included in the NDP may be determined based on a number of NDP streams transmitted from a plurality of communication devices.

A mapping code is determined based on $N_{IA-LTF}$, a number of NDP streams transmitted from a plurality of communication devices. When $N_{IA-LTF}$ satisfies $2^{(n+1)} < N_{IA-LTF} \leq (3 \cdot 2^n)$ (n=1, 2, ...), a mapping code may be determined according to Equation 3. When $N_{IA-LTF}$ satisfies $N_{IA-LTF} \leq 2^2$, a mapping code may be determined according to Equation 4. When $N_{IA-LTF}$ satisfies $(3 \cdot 2^n) < N_{IA-LTF} \leq 2^{(n+2)}$ (n=1, 2, ...), a mapping code may be determined according to Equation 5.

$$P_{IALTF} = P_{(2\alpha) \times (2\alpha)} = \begin{bmatrix} 1 & -1 & 1 & \cdots & 1 & 1 \\ 1 & -w^1 & w^2 & \cdots & w^{2\alpha-2} & -w^{2\alpha-1} \\ 1 & -w^2 & w^4 & \cdots & w^{2(2\alpha-2)} & -w^{2(2\alpha-1)} \\ \vdots & \vdots & \vdots & \ddots & \vdots & \vdots \\ 1 & -w^{2\alpha-2} & w^{2(2\alpha-2)} & \cdots & w^{(2\alpha-2)(2\alpha-2)} & -w^{(2\alpha-2)(2\alpha-1)} \\ 1 & -w^{2\alpha-1} & w^{2(2\alpha-1)} & \cdots & w^{(2\alpha-1)(2\alpha-2)} & -w^{(2\alpha-1)(2\alpha-1)} \end{bmatrix} \quad [\text{Equation 3}]$$

$$w = \exp(-j2\pi/2\alpha), \quad \alpha = \left\lceil \frac{N_{IA-LTF}}{2} \right\rceil$$

$$P_{IALTF} = P_{4 \times 4} = \begin{bmatrix} 1 & -1 & 1 & 1 \\ 1 & 1 & -1 & 1 \\ 1 & 1 & 1 & -1 \\ 1 & 1 & 1 & 1 \end{bmatrix} \quad [\text{Equation 4}]$$

$$P_{IALTF} = P_{(2^{(n+2)}) \times (2^{(n+2)})} = \begin{bmatrix} P_{(2^{(n+1)}) \times (2^{(n+1)})} & P_{(2^{(n+1)}) \times (2^{(n+1)})} \\ P_{(2^{(n+1)}) \times (2^{(n+1)})} & -P_{(2^{(n+1)}) \times (2^{(n+1)})} \end{bmatrix} \quad [\text{Equation 5}]$$

Here, Equation 5 may represent a mapping code extended from Equation 4.

According to one embodiment, a number of IA-LTFs included in the common training fields 430 of the NDPs illustrated in FIG. 4 may be determined as follows. A total number of antennas included in the communication devices illustrated in FIG. 4 is eight. When a total number of NDP streams transmitted from the communication devices, $N_{IA-LTF}$, is eight, which satisfies $(3\cdot2^1)<8\leq2^{(1+2)}$, (n=1), a mapping code may be determined based on Equation 5. Matrix dimensions may be $2^{(1+2)}$ according to Equation 5. Thus, the common training field 430 may include eight IA-LTFs in total.

According to another embodiment, it may be assumed that the first communication device transmits three NDP streams, the second communication device transmits four NDP streams, and the third communication device transmits two NDP streams. When a total number of NDP streams transmitted from the communication devices, $N_{IA-LTF}$, is nine, which satisfies $2^{(2+1)}<9\leq(3\cdot2^2)$, (n=2), a mapping code may be determined based on Equation 3. Matrix dimensions may be $2\alpha$ according to Equation 3. Thus, the common training field 430 may include 10 IA-LTFs in total.

According to still another embodiment, it may be assumed that the first communication device transmits five NDP streams, the second communication device transmits four NDP streams, and the third communication device transmits six NDP streams. When a total number of NDP streams transmitted from the communication devices, $N_{IA-LTF}$, is 15, which satisfies $(3\cdot2^2)<15\leq2^{(2+2)}$, (n=2), a mapping code may be determined based on Equation 5. Matrix dimensions may be $2^{(2+2)}$ according to Equation 5. Thus, the common training field 430 may include 16 IA-LTFs in total.

According to yet another embodiment, it may be assumed that the first communication device, the second communication device, and the third communication device each transmit one NDP stream. When a total number of NDP streams transmitted from the communication devices, $N_{IA-LTF}$, is three, which satisfies $3\leq2^2$, a mapping code may be determined based on Equation 4. Matrix dimensions may be 4 according to Equation 4. Thus, the common training field 430 may include four IA-LTFs in total.

Figure 5:
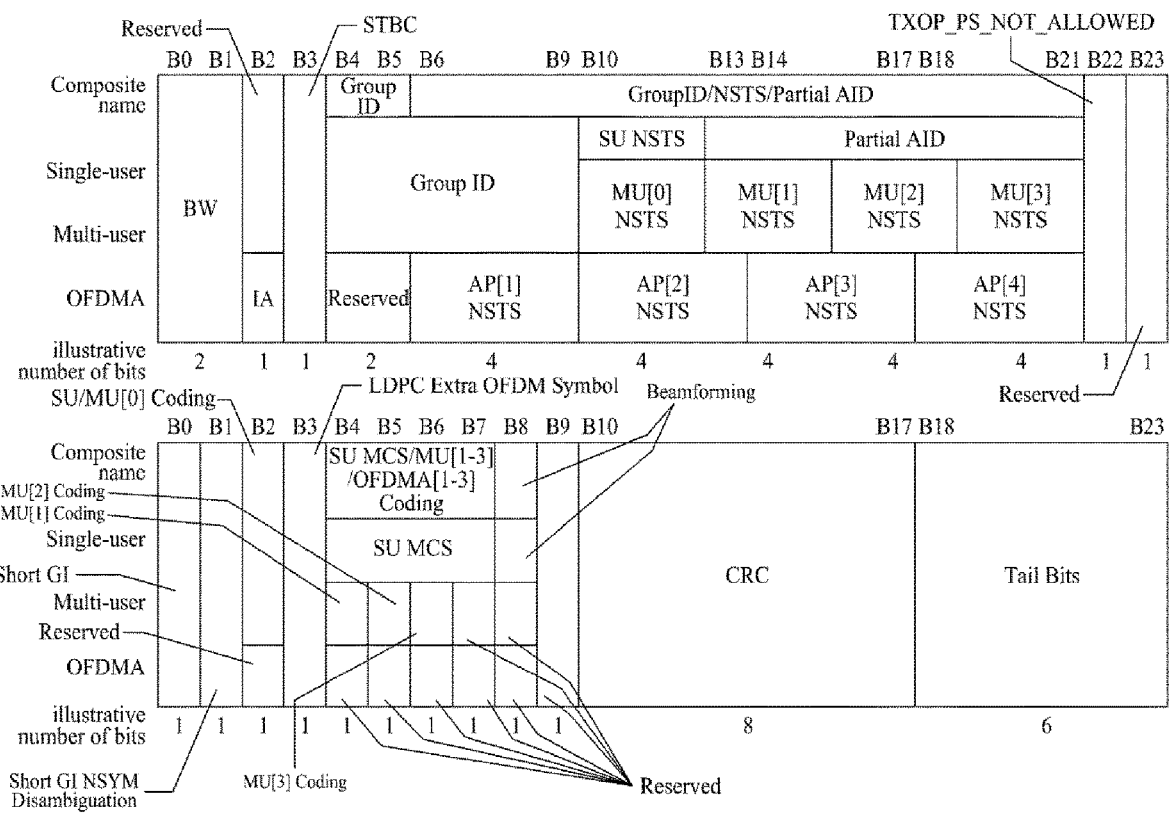
FIG. 5 illustrates an example structure of an IA-Signal Field-A (IA-SIG-A) when a number of communication devices participating in IA is predetermined according to an embodiment.

FIG. 5 illustrates an example structure of an IA-SIG-A when a number of communication devices participating in IA is predetermined according to an embodiment.

It may be assumed that each STA recognizes, through an NDP-A, information on a plurality of communication devices participating in IA. In this case, each of the communication devices may transmit a Number of Space Time Stream (NSTS) representing a number of streams to be transmitted by each communication device through an IA-SIG-A. When the communication devices transmit NDPs, the NSTS may represent a number of NDP streams transmitted by communication device or a number of antennas included in each communication device. Alternatively, when the communication devices transmit data frames, the NSTS may represent a number of data frames transmitted by communication device.

AP[1] NSTS, AP[2] NSTS, AP[3] NSTS, and AP[4] NSTS illustrated in FIG. 5 may represents numbers of streams to be transmitted by a first communication device, a second communication device, a third communication device, and a fourth communication device, respectively.

An STA receiving an NDP including an IA-SIG-A may estimate a signal-to-interference-plus-noise ratio (SINR) of a communication channel based on an NSTS of a communication device of the STA and feed back the estimated SINR to the reference communication device.

Figure 6:
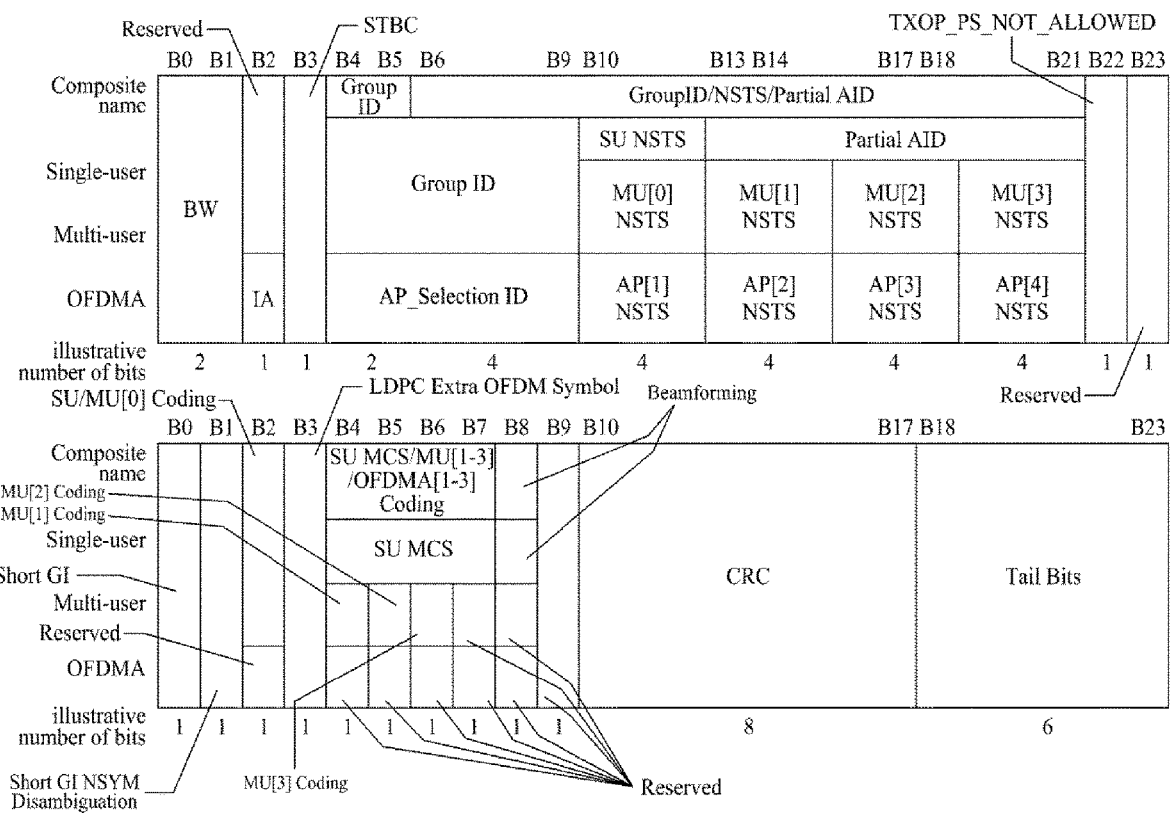
FIG. 6 illustrates an example structure of an IA-SIG-A when there are a great number of communication devices capable of participating in IA according to an embodiment.

FIG. 6 illustrates an example structure of an IA-SIG-A when there are a great number of communication devices capable of participating in IA according to an embodiment.

A number of bits expressed through an IA-SIG-A may be limited. Thus, a number of communication devices allowed to transmit NDPs in the same time period to receive feedback on channel information is also limited. As illustrated in FIG. 5, when the IA-SIG-A is capable of expressing four communication devices, the IA-SIG-A of FIG. 5 has no problem in expressing four or less communication devices participating in IA. However, when five or more communication devices participate in IA, the IA-SIG-A structure of FIG. 5 is incapable of sufficiently expressing from which communication device an NDP is transmitted. To solve this problem, the IA-SIG-A may include an AP_Selection ID representing a combination of predetermined communication devices.

A great number of communication devices capable of participating in IA may mean that a number of communication devices participating in IA is greater than a number of bits expressed by an IA-SIG-A included in an NDP. When there area greater number of communication devices capable of participating in IA, the communication devices may construct a combination of a plurality of communication devices capable of participating in IA in advance. Information on the combination is included in the AP_Selection ID, and the communication devices may transmit the AP_Selection ID to an STA using an NDP-A or another control frame. In the NDP, information indicating which communication device the NDP is transmitted from may be included in the AP_Selection ID of the IA-SIG-A.

STAs may estimate an SINR of a communication channel based on an NSTS of a reference communication device of the STAs through the AP_Selection ID of the IA-SIG-A of the received NDP and feed back the estimated SINR to the reference communication device.

Figure 7:
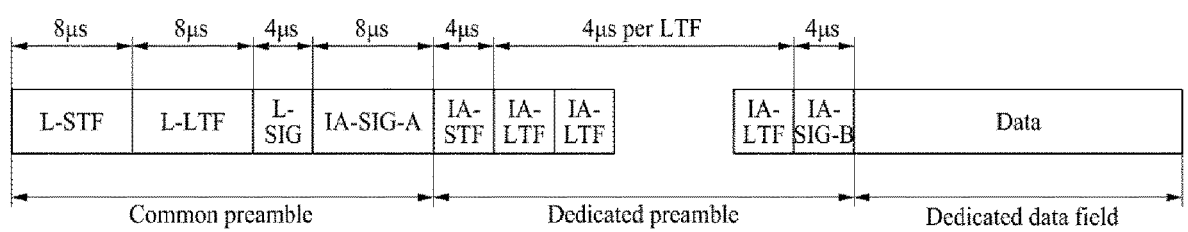
FIG. 7 illustrates an example of a data frame in a PPDU structure transmitted from communication devices participating in IA according to an embodiment.

FIG. 7 illustrates an example of a data frame in a PPDU structure transmitted from communication devices participating in IA according to an embodiment.

A plurality of communication devices may transmit data frames to STAs communicating with the communication devices based on SINRs received from the STAs. The data frame illustrated in FIG. 7 may have the same structure as the NDP illustrated in FIGS. 3 and 4 except for an IA-SIG-B and a dedicated data field added last in the frame.

The data frame in the PPDU structure is divided into a common preamble, a dedicated preamble, and a dedicated data field. The common preamble is a portion commonly applied to the communication devices participating in IA. That is, common preambles ofNDPs transmitted from the communication devices may include the same value in the same structure. The common preamble includes an L-STF, an L-LTF, an L-SIG, and an IA-SIG-A.

The dedicated preamble and the dedicated data field are portions transmitted via beamforming with a transmission vector or matrix predetermined by communication device or transmitted without beamforming. The dedicated preamble may include an IA-STF, an IA-LTF, and an IA-SIG-B. Here, the IA-SIG-B included in the dedicated preamble may have a different structure from the NDP of FIG. 2 and, for example, have a structure illustrated in FIG. 8.

Figure 9:
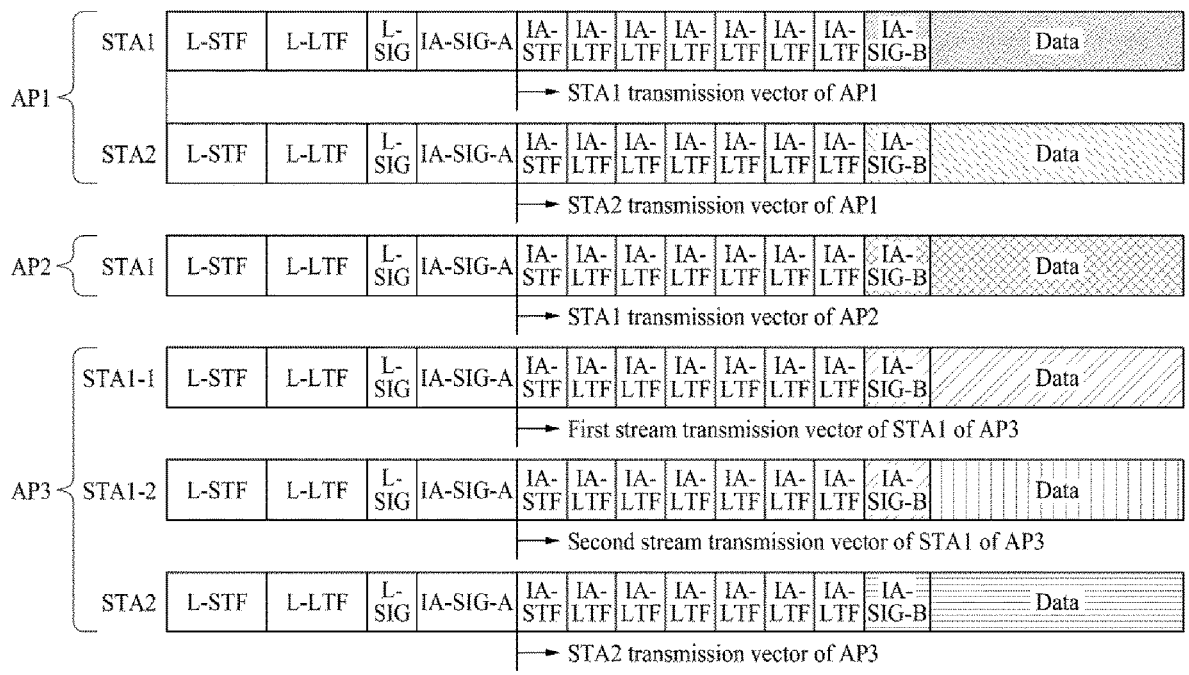
FIG. 9 illustrates an example of a data frame transmitted from each communication device when three communication devices participate in IA according to an embodiment.

FIG. 9 illustrates an example of a data frame transmitted from each communication device when three communication devices participate in IA according to an embodiment.

FIG. 9 illustrates data frames in a wireless transmission environment of three communication devices. Here, a first communication device (AP1) may transmit two data frame streams through two antennas, a second communication device (AP2) may transmit one data frame stream through one antenna, and a third communication device (AP3) may three data frame streams through two antennas.

A dedicated preamble and a dedicated data field of a data frame may be transmitted via beamforming with a transmission vector and matrix predetermined by communication device or transmitted without beamforming. Here, even in a case of the same communication device, the predetermined transmission vector and matrix may have a different value depending on an STA receiving a data frame stream. An IA-SIG-B includes information for an STA receiving a data frame and thus may have a different value depending on an STA to which a communication device transmits a data frame.

Figure 10:
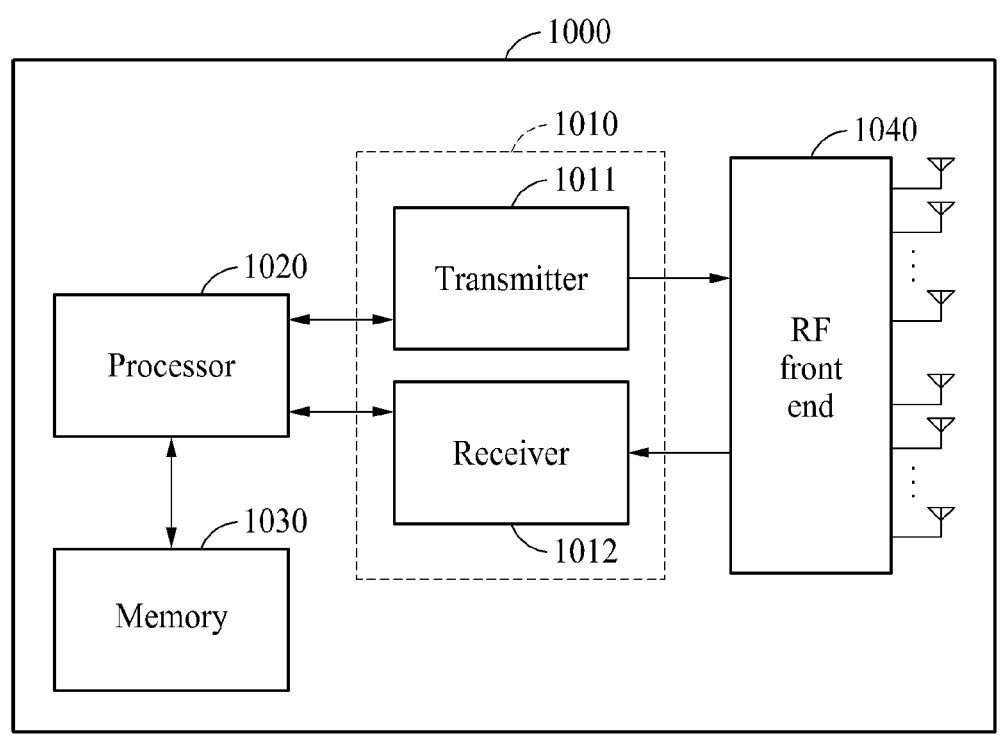
FIG. 10 illustrates a detailed configuration of a communication device according to an embodiment.

FIG. 10 illustrates a detailed configuration of a communication device according to an embodiment.

Referring to FIG. 10, the communication device 1000 may include a communicator 1010, a processor 1020, a memory 1030, and an RF Front End 1040.

The communicator 1010 may include a transmitter 1011 and a receiver 1012. The communicator 1010 may communicate with an STA through the RF Front End 1040.

The transmitter 1011 may transmit a stream to an STA and perform coding, puncturing, interleaving, mapping, modulation, inverse fast Fourier transform (IFFT), spatial mapping, or the like, and a detailed configuration thereof is not limited.

The receiver 1012 may receive a stream from an STA and perform fast Fourier transform (FFT), equalization, demapping, demodulation, deinterleaving, depuncturing, decoding, or the like, and a detailed configuration thereof is not limited.

The processor 1020 controls the communicator 1010. The processor 1020 may process digital transmission and reception supported by communication standards and may control, for example, Protocol Layer Convergence Procedure (PLCP), Physical Medium Dependent (PMD), associated layer management, Medium Access Control (MAC) layer, or the like.

The processor 1020 may construct an NDP-A including information on a plurality of communication devices participating in IA and transmit the NDP-A to an STA. Also, the processor 1020 may construct an NDP including a common signal field and a common training field commonly applied to a plurality of communication devices and transmit the NDP to an STA.

The memory 1030 is a storage circuit, which may be configured as an appropriate combination of various logics, circuits, codes, or the like, and a configuration thereofis not limited.

The device structure illustrated in FIG. 10 may be applied to not only the communication device 1000 but also an STA performing communication with the communication device 1000.

Figure 11:
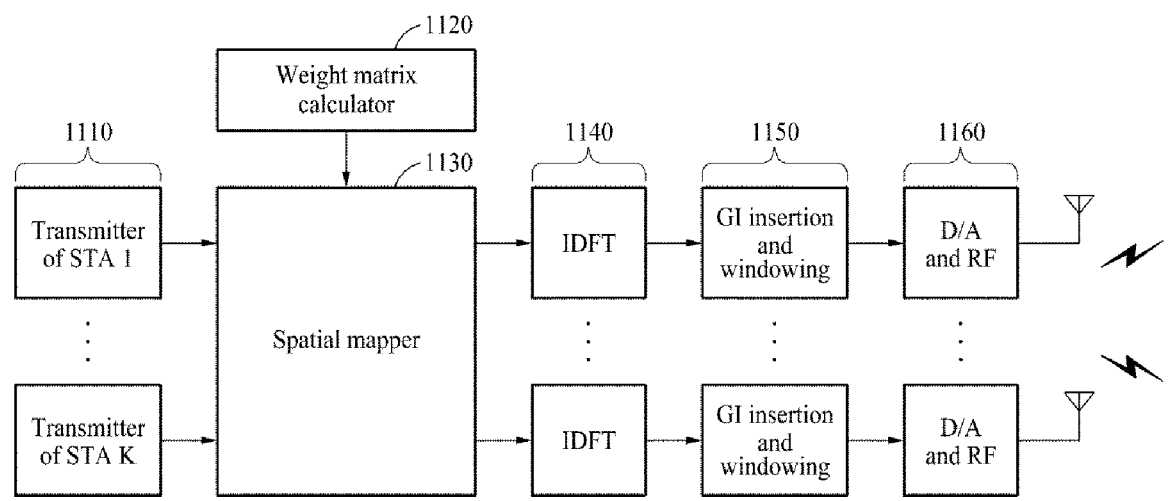
FIGS. 11 and 12 illustrate a process of transmitting a stream according to an embodiment.
Figure 12:
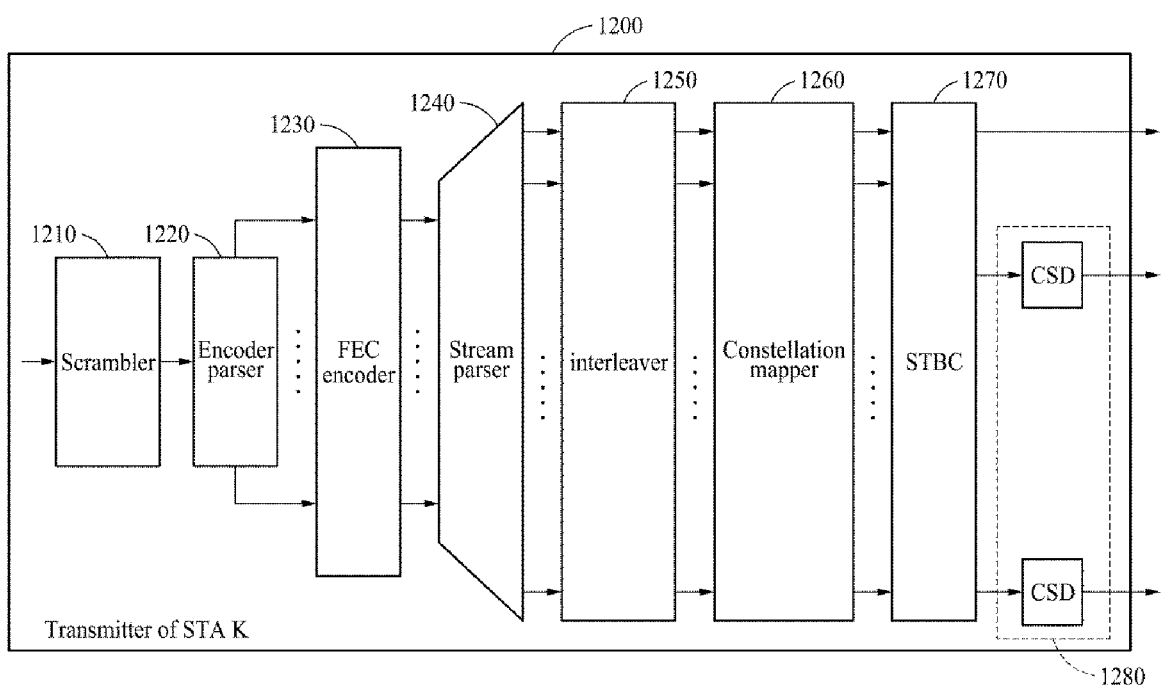

FIGS. 11 and 12 illustrate a process of transmitting a stream according to an embodiment.

In FIG. 11, it is assumed that transmitters 1110 of STA 1 to STA K simultaneously transmit a plurality of transmission streams. First, a weight matrix calculator 1120 may calculate a weight matrix or weight vector to be applied to the transmission streams of STA 1 to STA K from an MIMO channel. The weight matrix calculator 1120 may determine STA 1 to STA K to simultaneously transmit transmission streams. A spatial mapper 1130 may map the determined weight vectors to the transmission streams of STA 1 to STA K. An inverse discrete Fourier transform (IDFT) performer 1140 may perform IDFT on the mapped transmission streams. A guard interval (GI) inserter 1150 may add a GI to the IDFT transmission streams and perform windowing. A radio frequency (RF) unit 1160 may perform digital-to-analog (D/A) conversion on the transmission streams and transmit the transmission streams through an RF.

FIG. 12 illustrates a transmitter 1200 of STA K. A scrambler 1210 may scramble data to be transmitted. An encoder parser 1220 may parse as many scrambled data as a number of forward error correction (FEC) encoders 1230. An FEC encoder 1230 may perform FEC encoding on the parsed data. A stream parser 1240 may parse as many encoded data as a number of streams. An interleaver 1250 may interleave the parsed data. A constellation mapper 1260 may map the interleaved data using any one of binary phase-shift keying (BPSK), quadrature phase-shift keying (QPSK), 16 quadrature amplitude modulation (16QAM), 64QAM, and 128QAM. A spatial-time block code (STBC) encoder 1270 may perform STBC on the mapped data. A cyclic shift delay (CSD) performer 1390 may perform CSD on the encoded data and transmit the data to the spatial mapper 1130 of FIG. 11.

Figure 13:
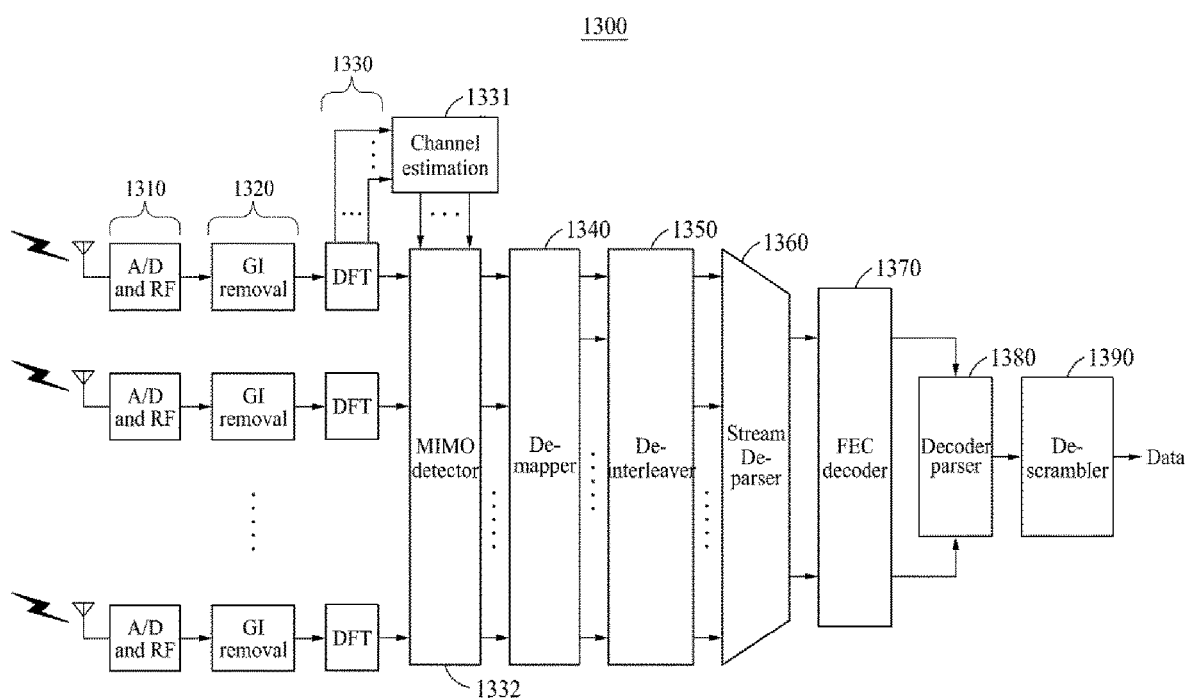
FIG. 13 illustrates a process of receiving a stream according to an embodiment.

FIG. 13 illustrates a process of receiving a stream according to an embodiment.

FIG. 13 illustrates a receiver 1300 of STA K. First, an RF unit 1310 may receive a stream passing through a radio channel and perform analog-to-digital (A/D) conversion on the stream. A GI remover 1320 may perform carrier sensing, AGC, timing synchronization, frequency offset estimation, or the like on the received stream to remove a GI. A discrete Fourier transform (DFT) performer 1330 may perform DFT on the stream. A channel estimator 1331 may estimate a channel based on an LTF of the DFT stream. An MIMO detector 1332 may demodulate data in a data field of the DFT stream using a channel estimation result. A de-mapper 1340 may convert the demodulated data into a soft value needed for FEC decoding. A de-interleaver 1350 may de-interleave the converted soft value. A stream de-parser 1360 may parse the de-interleaved soft value according to a number of FEC decoders 1370. An FEC decoder 1370 may perform FEC decoding on the parsed soft value. A decoder parser 1380 may parse the FEC-decoded soft value. A de-scrambler 1390 may perform de-scrambling on the parsed soft value to reconstruct data received by STA K.

Figure 14:
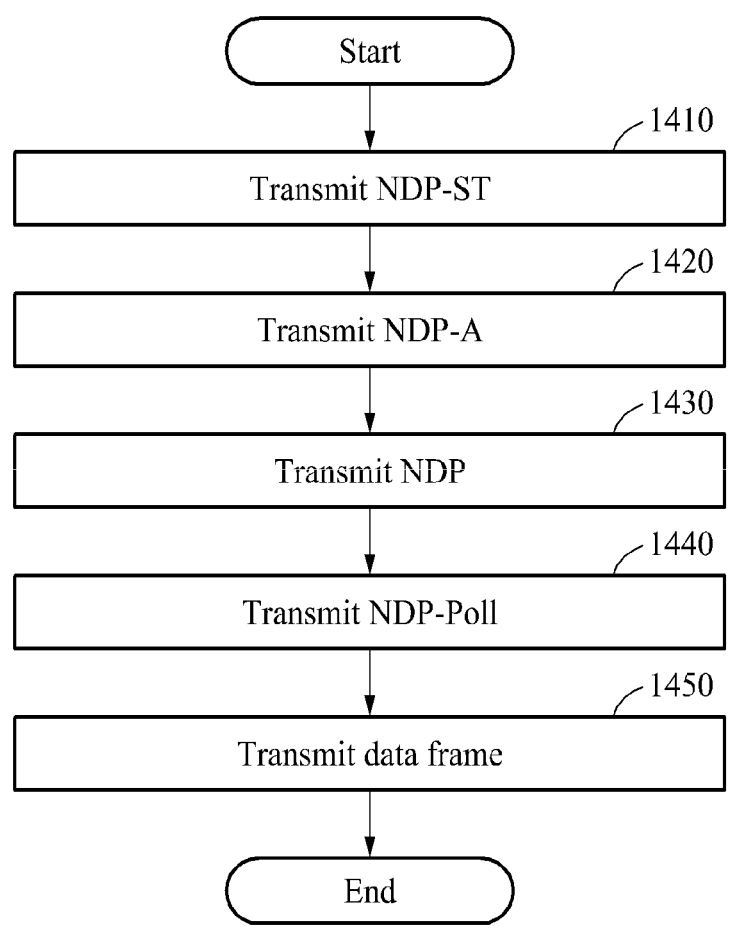
FIG. 14 illustrates a frame transmission method performed by a communication device according to an embodiment.

FIG. 14 illustrates a frame transmission method performed by a communication device according to an embodiment.

The frame transmission method of the communication device according to the embodiment may be performed by a processor of the communication device and include transmitting an NDP-ST including information indicating start of transmission of an NDP-A in operation 1410, transmitting an NDP-A including information on a plurality of communication devices participating in IA in operation 1420, transmitting an NDP including a common signal field and a common training field commonly applied to the plurality of communication device in operation 1430, transmitting an NDP-Poll including information indicating that transmission of the NDP is completed in operation 1440, and transmitting a data frame including data to be transmitted in operation 1450. Here, operation 1410 may be performed by a communication device selected as a master communication device among the communication devices. Operations 1420 to 1450 may be simultaneously performed by the communication devices participating in IA.

The detailed matters described above with reference to FIGS. 1 to 13 are applied to the operations illustrated in FIG. 14, and thus detailed descriptions of the operations are omitted.

The example embodiments described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described examples may be realized as program instructions implemented by various computers and be recorded in non-transitory computer-readable media. The media may also include, alone or in combination with the program instructions, data files, data structures, and the like. The program instructions recorded in the media may be designed and configured specially for the embodiments or be known and available to those skilled in computer software. Examples of the non-transitory computer readable recording medium may include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine codes, such as produced by a compiler, and higher level language codes that may be executed by the computer using an interpreter. The described hardware devices may be configured to act as one or more software modules in order to perform the operations of the above-described example embodiments, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents. Thus, other implementations, alternative embodiments and equivalents to the claimed subject matter are construed as being within the appended claims.

What is claimed is:

1. A transmission method of a communication device, the method comprising:
    transmitting a null data packet announcement (NDP-A) frame after transmitting a NDP-start frame indicating start of transmission for the NDP-A frame;
    transmitting a null data packet (NDP) frame, after transmitting the NDP-A frame,
    wherein the NDP frame includes a Legacy-Short Training Field (L-STF), a Legacy-Long Training Field (L-LTF), a Legacy-Signal Field (L-SIG), and a Signal Field-A (SIG-A).

2. The transmission method of claim 1, further comprising:
    transmitting a null data packet poll (NDP-Poll) frame after transmitting the NDP frame.

3. The transmission method of claim 1, wherein the NDP frame has a physical layer convergence procedure protocol data unit (PPDU) structure that includes a common preamble and a dedicated preamble.

4. The transmission method of claim 3, wherein the common preamble includes the L-STF, the L-LTF, the L-SIG, and an IA-Signal Field-A (IA-SIG-A).

5. The transmission method of claim 3, wherein the dedicated preamble includes an IA-Short Training Field (IA-STF), an IA-Long Training Field (IA-LTF), and an IA-Signal Field-B (IA-SIG-B).

6. The transmission method of claim 5, wherein the IA-SIG-B includes a different value for each communication device.

7. A communication device performing a transmission method comprising:
    one or more processor is configured to:
    transmit a null data packet announcement(NDP-A) frame after transmitting a NDP-start frame indicating start of transmission for the NDP-A frame;
    transmit a null data packet (NDP) frame, after transmitting the NDP-A frame,
    wherein the NDP frame includes a Legacy-Short Training Field (L-STF), a Legacy-Long Training Field (L-LTF), a Legacy-Signal Field (L-SIG), and a Signal Field-A (SIG-A).

8. The communication device of claim 7, wherein the processor is configured to:
    transmit a null data packet poll (NDP-Poll) frame after transmitting the NDP frame.

9. The communication device of claim 7, wherein the NDP frame has a physical layer convergence procedure protocol data unit (PPDU) structure that includes a common preamble and a dedicated preamble.

10. The communication device of claim 9, wherein the common preamble includes the L-STF, the L-LTF, the L-SIG, and an IA-Signal Field-A (IA-SIG-A).

11. The communication device of claim 9, wherein the dedicated preamble includes an IA-Short Training Field (IA-STF), an IA-Long Training Field (IA-LTF), and an IA-Signal Field-B (IA-SIG-B).

12. The communication device of claim 11, wherein the IA-SIG-B includes a different value for each communication device.

\* \* \* \* \*